(12) United States Patent
Menz et al.

(10) Patent No.: US 10,076,921 B2
(45) Date of Patent: Sep. 18, 2018

(54) DOCUMENT WITH HOLOGRAM, AND METHOD OF PRODUCING SAME

(75) Inventors: Irina Menz, Grasbrunn (DE); Andreas Wanke, Munich (DE); Günther Dausmann, Grasbrunn (DE); Philippe Huet, Sainte Genevieve des Bois (FR); Hugues Souparis, Paris (FR)

(73) Assignee: HOLOGRAM INDUSTRIES RESEARCH GMBH, Pliening-Ottersberg (DE)

( * ) Notice: Subject to any disclaimer, the term of this patent is extended or adjusted under 35 U.S.C. 154(b) by 245 days.

(21) Appl. No.: 13/817,458

(22) PCT Filed: Aug. 11, 2011

(86) PCT No.: PCT/EP2011/063877
§ 371 (c)(1),
(2), (4) Date: May 23, 2013

(87) PCT Pub. No.: WO2012/022675
PCT Pub. Date: Feb. 23, 2012

(65) Prior Publication Data
US 2013/0241190 A1    Sep. 19, 2013

(30) Foreign Application Priority Data
Aug. 18, 2010    (DE) .......................... 10 2010 034 793

(51) Int. Cl.
*B42D 15/00* (2006.01)
*B42D 15/10* (2006.01)
(Continued)

(52) U.S. Cl.
CPC .............. *B42D 25/328* (2014.10); *B32B 7/12* (2013.01); *B32B 27/365* (2013.01);
(Continued)

(58) Field of Classification Search
CPC ...... B42D 15/00; B42D 15/10; B42D 25/238; B42D 25/00; B42D 25/23; B42D 25/328;
(Continued)

(56) References Cited

U.S. PATENT DOCUMENTS 4,852,911 A * 8/1989 Hoppe ............. G06K 19/06196
283/109
6,019,395 A * 2/2000 Souparis ............... G09F 3/0292
283/109
(Continued)

FOREIGN PATENT DOCUMENTS

WO    WO 2009056352 A1 * 5/2009 ............. B32B 27/06

*Primary Examiner* — Justin V Lewis
(74) *Attorney, Agent, or Firm* — Mark M. Friedman

(57) ABSTRACT

A description is given of a document with a hologram as a security feature, in particular an identity card (12), consisting of a polycarbonate card body (10), which has a volume hologram label (2, 9) embedded therein. A description is additionally given of a method for producing the document, in which volume hologram labels (2) arranged on a carrier sheet are brought into contact with adhesive regions (4) on a thermoplastic sheet (5.1), the adhesive surfaces are cured and the carrier sheet is then removed. A second plastics sheet (5.2) is then adhesively bonded onto the first plastics sheet (5.1), bearing the hologram labels, using a second adhesive (7) in the region of the hologram labels (2) to form a two-layered sheet composite (6) which, finally, is laminated, together with further thermoplastic sheets, in a card-lamination press, under the action of pressure and temperature, to give a card body (10), individual identity cards (12) being punched out.

7 Claims, 1 Drawing Sheet

(51) Int. Cl.
*G09C 3/00* (2006.01)
*B44F 1/10* (2006.01)
*B42D 25/328* (2014.01)
*B42D 25/309* (2014.01)
*B42D 25/23* (2014.01)
*B32B 37/12* (2006.01)
*B32B 37/18* (2006.01)
*G03H 1/00* (2006.01)
*G03H 1/02* (2006.01)
*G03H 1/18* (2006.01)
*B42D 25/455* (2014.01)
*B42D 25/46* (2014.01)
*B42D 25/47* (2014.01)
*B32B 7/12* (2006.01)
*B32B 27/36* (2006.01)
*B32B 38/00* (2006.01)

(52) U.S. Cl.
CPC ........ *B32B 37/1292* (2013.01); *B32B 37/185* (2013.01); *B42D 25/23* (2014.10); *B42D 25/309* (2014.10); *B42D 25/455* (2014.10); *B42D 25/46* (2014.10); *B42D 25/47* (2014.10); *G03H 1/0011* (2013.01); *G03H 1/0248* (2013.01); *G03H 1/18* (2013.01); *B32B 2038/0076* (2013.01); *B32B 2305/347* (2013.01); *B32B 2307/40* (2013.01); *B32B 2310/0831* (2013.01); *B32B 2425/00* (2013.01); *B42D 2033/30* (2013.01); *B42D 2033/32* (2013.01); *G03H 1/182* (2013.01); *G03H 2001/185* (2013.01); *G03H 2001/186* (2013.01); *G03H 2001/187* (2013.01); *G03H 2210/54* (2013.01); *G03H 2223/12* (2013.01); *G03H 2250/10* (2013.01); *G03H 2270/23* (2013.01)

(58) Field of Classification Search
CPC ...... B42D 25/47; B42D 25/46; B42D 25/455; B42D 2033/32; B42D 2033/30; G09C 3/00; G03H 1/0011; G03H 1/18; G03H 1/0248; G03H 1/182; G03H 2250/10; G03H 2001/186; G03H 2001/185; G03H 2223/12; G03H 2270/23; G03H 2001/187; G03H 2210/54; B32B 27/365; B32B 7/12; B32B 37/1292; B32B 37/185; B32B 2305/347; B32B 2307/40; B32B 2425/00; B32B 2038/0076; B32B 2310/0831
USPC .... 283/67, 70, 72, 74, 75, 94, 98, 101, 901, 283/86; 428/29
See application file for complete search history.

(56) References Cited

U.S. PATENT DOCUMENTS

| | | | | |
|---|---|---|---|---|
| 6,027,789 | A | * | 2/2000 | Canet ................ B41N 10/02 101/135 |
| 6,066,378 | A | * | 5/2000 | Morii ................ G03H 1/0248 283/108 |
| 2002/0015836 | A1 | * | 2/2002 | Jonza ................ B32B 27/08 428/216 |
| 2005/0230960 | A1 | * | 10/2005 | Bilodeau et al. ............. 283/75 |
| 2006/0181077 | A1 | * | 8/2006 | Kaule ................ B41M 3/148 283/72 |
| 2007/0085334 | A1 | * | 4/2007 | Watanabe et al. ............. 283/72 |
| 2008/0169640 | A1 | * | 7/2008 | Scheir ............. 283/94 |
| 2010/0295290 | A1 | * | 11/2010 | Muth ................ B32B 27/06 283/109 |

* cited by examiner

DOCUMENT WITH HOLOGRAM, AND METHOD OF PRODUCING SAME

The invention relates to a document, such as e.g. an identity card, smartcard or driver's license, having a hologram embedded in the plastic card body as a security feature, as well as to a method for producing the same, for improving protection against forgery and durability.

It is well-known that volume holograms on photopolymer basis which are applied on the card surface e.g. of identity cards, must be sealed by a protective foil or protective lacquer for protection against mechanical and chemical environmental influences and forgery attempts. For this purpose, protective coatings must be found which guarantee high adhesive power as well as good transparency and scratch resistance over long periods of time.

An alternative to the application of such volume holograms on the card surface would be the embedding of volume holograms into the card body.

Commonly, for the production of polycarbonate cards, individual thin polycarbonate foils are laminated under high pressure and high temperature in a card-lamination press to form the card body. To guarantee a stable card structure, foils with different surface roughnesses are used. If a volume hologram film, in particular a reflection volume hologram polymer film, is placed between the polycarbonate foils and then the foil stack is laminated in the card-lamination press to form the card body, inhomogeneous changes in color can be seen in the hologram after pressing. Under these conditions of temperature and pressure, the hologram is deformed the more the greater the surface roughness of the polycarbonate foils pressing on the hologram. The Bragg lattice planes stored in the hologram are upset and stretched, causing changes in color during hologram reconstruction. Also, even smallest dust particles etc. lead to visible changes in color of the embedded hologram.

WO 2005/091 085 A2 proposes a subsequent individualization of volume holograms by exploitation of this deformation effect, wherein the usage of foils with surface relief information is proposed which can be transferred into the hologram by means of heat and pressure. The degree of hologram deformation also depends on the surface size of the volume hologram film and on its thickness. The thicker and smaller the film surface, the higher the surface pressures that act on the film.

Until now, no solution is known with which volume holograms can be embedded in card bodies without any alteration or impairment of the holographic information content.

Holographic storage films on polymer basis for producing volume holograms, in particular reflection volume holograms, are well-known since long time. For achieving high diffraction efficiencies of the information copied from a master by means of laser light, the films are subjected to different secondary treatments. The diffraction efficiency is a measure for the brightness of a reflection hologram through which the hologram is perceived by the observer in the respective reconstruction angle. There are films subjected to secondary treatment, after laser exposure and subsequent UV light fixation, by means of a further 30-60 minutes-baking process, at temperatures >100° C. With this baking process, the diffraction efficiency can be increased from approximately 60%~to up to 96%.

For mass production of volume holograms with the highest diffraction efficiency, commonly polymer film reels are used. The polymer film is laminated onto a master, the information is copied from the master into the film by means of laser light, delaminated from the master, the copied information fixed by means of UV light, and the film is again rolled up on the reel. After UV fixation, the exposed polymer film reel is again unreeled, fed through an oven and baked at higher temperatures for a further increase of the diffraction efficiency. Depending on the selected temperature and size of the oven, this is done with a higher or lower foil passage speed. This process is the speed-determining step in mass production.

WO 2007/131 496 A2 describes a subsequent personalization of volume holograms during their application on identity cards with a monomer containing adhesive by means of a mask color tuning process. The producer of such identity cards exposes a holographic polymer film to light on site or purchases the already exposed holographic film, applies and individualizes the film on identity cards and has to seal the card surface with a protective coating as the last step. The producer undergoes great efforts to implement these procedural steps.

It is therefore an object of the invention to disclose a document with embedded hologram and a method for producing the same, wherein at minimum cost and effort a volume hologram with individualized personal data is embedded as a security feature into the document card body without any impairment to the information content of the hologram, wherein additionally the mechanical and chemical resistance and durability of the identity card as well as the protection against forgery thereof are further improved.

This object is achieved by a method for producing a hologram according to claim 1. Advantageous embodiments are indicated in the dependent claims referring back to the independent claims.

Figure 1:
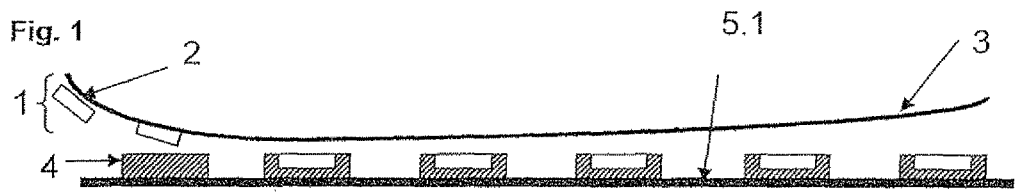
FIG. 1 illustrates the first step of the method of applying a reflective volume holographic label film by means of adhesive onto a thermoplastic foil.

Therefore, the document according to the invention with hologram, e.g. an identity card (12), consists of a card body (10) based on plastics, in particular polycarbonate, into which a volume hologram label (2, 9) entirely covered by adhesive is embedded. Therewith, the volume hologram label (2) was embedded during the temperature- and pressure-supported card body lamination process into the card body (10) of the identity card (12) while the holographic information was maintained in its entirety.

Preferably, the volume hologram label is an individualized volume hologram label (9) whose individual personal data were generated during adhesive bonding by means of a radiation-curing monomer-containing adhesive (7).

With the method according to the invention for producing the document, the object is achieved by initially applying a reflection volume hologram label film (1), consisting of a volume hologram label (2) with layer thicknesses of 10-20 µm on a carrier foil (3), by means of adhesive (4) onto a thin thermoplastic foil (5.1) with a rough surface, preferably a polycarbonate foil with a thickness between 50-200µ, and then removing the carrier foil (3) (FIG. 1).

In the second step, an additional adhesive layer is applied onto the hologram surface and glued to a second plastic foil (5.2) with a rough surface, preferably a polycarbonate foil, to form a two-layer composite foil (6). The adhesive can also be applied on the second polycarbonate foil (5.2) and then contacted with the hologram-carrying polycarbonate foil in the area of the labels, and cured.

Figure 2:
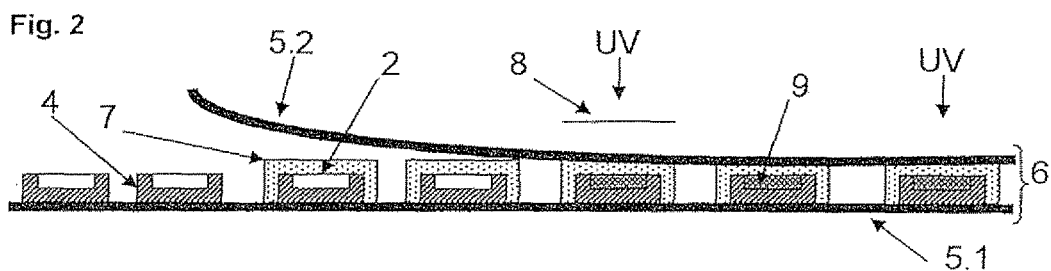
FIG. 2 illustrates the second step if forming a two-layer-composite foil, using a second adhesive and a second plastic foil.

The adhesive applied in the second step can be a radiation-curing, monomer-containing glue (7) which is partially cured by light exposure through a mask (8) and completely hardened by light after removal of the mask and a certain reaction time of the adhesive, which is still liquid in some parts (FIG. 2). In this manner, individual information of the mask is transferred into the hologram, This hologram individualization is already known as the color tuning method.

Figure 4:
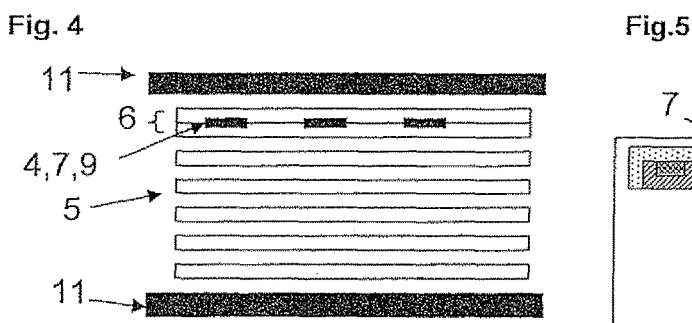
FIG. 4 illustrates the third step in which the two-layered foil composite structure is pressed together with other polycarbonate foils in a card-lamination press, forming the card body.

The two-layered foil composite structure (6) with the individualized hologram label (9) between the two polycarbonate foils is now pressed together with other polycarbonate foils (5) in a card-lamination press forming the card body (10) (FIG. 4). Normally, the polycarbonate card body is produced in a device consisting of planar metal plates (11) between which several thermoplastic foils (5) with defined surface roughnesses are stacked on top of each other and pressed to form the card body (10) (FIG. 4) under high pressure of 3-5 bar and high temperatures around 180° C.

By the application of two adhesive layers between the thermoplastic foils (5.1 and 5.2) with surface roughness and the volume hologram there is achieved that the rough surface of the foils is filled with adhesive, and therewith that the hologram is prevented from being further affected during the card lamination process. In this manner, holograms with individual personal information, such as a passport photograph, can also be embedded without any change in information or impairment of a visual recognizability.

If a radiation-curing, monomer-containing adhesive (7) is used, an individualization of the hologram applied on the plastic foil (5.1) can be performed during production of the composite foil (6) by means of mask light exposure according to the well-known color tuning method. Thus, it becomes possible to perform hologram application on plastic foils and personalization of the applied holograms at separate sites, which has several advantages.

No transfer of confidential personal data outside of the card production sites is necessary. The producer of identity cards can be supplied with thermoplastic foil which has been produced outside his premises and on which the hologram has been applied, and only performs hologram individualization as well as the pressing to card bodies which takes place on his premises, anyway.

The use of the two-layered composite foil (6) according to the invention also allows the embedding of hologram labels with small surfaces into the card body, which until now has not been possible without impairment of the hologram quality. The smaller the surface of the raised hologram, the higher the surface pressure on the hologram at the beginning of the card lamination process.

According to the invention, the local pressure on the hologram can be distributed over a larger surface and thus reduced during the card lamination process by application of an adhesive surface on the hologram which is relatively large in comparison to the hologram. Care must be taken, however, to ensure that the adhesive surface is located within the edges of the identity card (12) the which to form the card body (10) is punched out during the last step.

Figure 3:
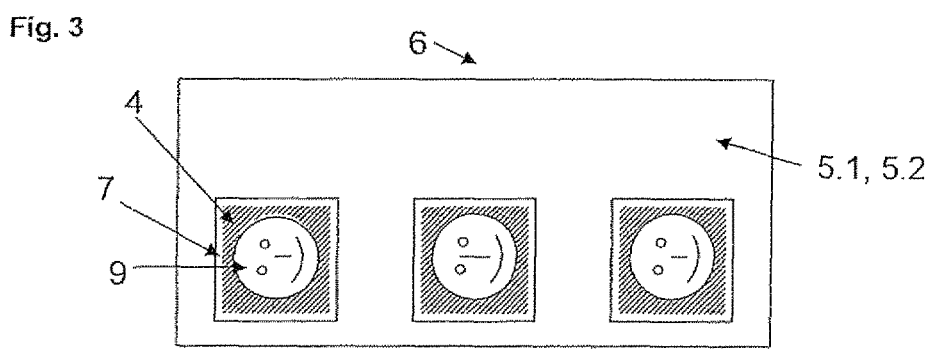
FIG. 3 shows a plan view onto the two-layer-composite foil.

A particular advantage of the invention consists in the fact that a method has been found by means of which adhesive layers of suitable adhesives (4), (7) which withstand the high temperature and pressure requirements during the card lamination process are arranged between the foils (5.1 and 5.2) to be laminated such that a high bond strength is achieved. It has been shown that a good bond strength of the card body (10) can only be achieved if a two-layered composite foil (6) is produced before the card lamination process. The first adhesive surface, which has been cured during hologram application, must be entirely covered by the adhesive surface (7) applied in the second step (FIG. 3). If the surface of adhesive (7) applied in the second step is smaller than the surface of adhesive (4) which has been cured during hologram application, no sufficient adhesion of the cured adhesive (4) to the neighboring foil layer in the card body (10) can be obtained.

Another particular advantage is that with the method according to the invention, a card body, in particular a polycarbonate card body with an embedded hologram enclosed by an adhesive, can be produced, in which the overall visual impression of the card is not impaired by visible edges of adhesive in the pressed polycarbonate card body.

Differently from other types of plastics, such as PVC, polycarbonate has a high refractive index of 1.58. Most adhesives based on acrylate which anaerobically perform radiation-curing have refractive indices about 1.47-1.53. The higher the difference in refractive index between two adjacent materials, the higher the light refraction and thus the better the visibility of the boundary surface. Therefore, an adhesive (7), in particular a radiation-curing urethane-modified acrylic adhesive, having a refraction index >1.49, advantageously >1.52, and a high transparency in the visible wavelength range, is preferred.

Visibility of the adhesive edges in the card body (10) can be further minimized by curing of the adhesive (7) in a layer which is as thin as possible, preferably having a thickness between 10 and 40µ, particularly 15-25µ, whereas adhesive layer thicknesses <10 µm slow down the color tuning process for individualization of the hologram labels too much. The adhesive can be applied, for instance, with the silk screen printing method, slit-casting method or roller engraving printing method.

Surprisingly, two-layered composite foils (6) wherein both plastic foils (5.1 and 5.2) are interconnected by adhesive-coated hologram labels having an overall layer thickness of up to 80 µm and clearly visible edges of adhesive, can be laminated well together with other plastic layers to form card bodies with edges of adhesive which are no longer visible and with undisturbed card bond adhesion, even if only a 50 µm thick foil (5.2) has been used for the two-layered composite foil, which forms the card surface after card lamination.

Obviously, under the card-lamination conditions, the cured adhesive is compressed to form an optically thicker layer without losing its adhesive properties. For cured urethane-modified acrylate adhesives, the adhesives manufacturer has indicated maximum short-time temperatures of 140° C. to 170° C. Although during the card lamination process, this temperature range is exceeded with 180° C., a good card bonding is achieved. There are numerous adhesives with high temperature stability on epoxide basis which withstand temperatures >180° C. Adhesives of this type, however, have impaired monomer diffusion properties which do not allow hologram individualization with the color tuning method in the desired manner. Therefore, urethane-modified acrylate adhesives with temperature resistances of >150° C., advantageously >160° C., in the cured state are preferred.

Embodiments of the method are presented in the following.

EXAMPLE 1

A reflection volume hologram polymer film which has been baked for 30 min at 140° C. is processed in a label punching machine to form a reflection volume hologram label film (1) with round hologram labels having a diameter of 3 cm and label spaces of 6 cm. Adhesive surfaces with a size of 4×4 cm and a thickness of 15 µm are applied on a 100 µm thick polycarbonate foil (5.1) (Bayer Makrolon), spaced by 6 cm, by the silk screen printing method. The employed adhesive (4) is a UV-curing acrylate lacquer with a refraction index of 1.51. The adhesive (4) can also be a fast-curing adhesive which can be activated by heat.

The reflection volume hologram label film (1) is laminated onto the polycarbonate foil printed with adhesive such that the labels contact the adhesive surfaces. Then the film is cured with UV light and the carrier foil (3) is removed (FIG. 1). A second adhesive layer with a size of 5×5 cm and a thickness of 20 µm, containing a light-curing monomer-containing urethane-modified acrylate adhesive (7) with a refraction index of 1.53, is printed onto the applied hologram labels with the silk screen printing technique. Then a second, 50 µm thick polycarbonate foil (5.2) is laminated onto the adhesive layer, a partly transparent mask foil with personal information, e.g. passport photographs, is placed onto the polycarbonate foil and exposed to light through the mask for 0.5-2 seconds. The adhesive (7) is cured in the exposed areas whereas monomers of the still liquid adhesive (7) in the areas covered by the mask diffuse into the hologram layer and cause an alteration in color of the hologram. One to two minutes after mask light exposure, the entire adhesive area is completely cured by light (FIG. 2). The mask can also be an LCD or DLP projection mask.

Figure 5:
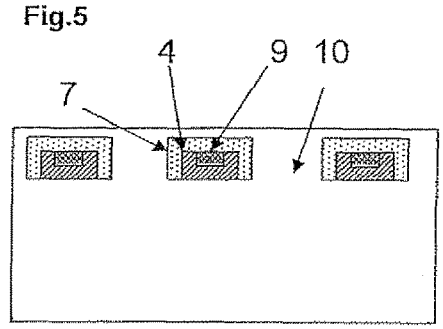
FIG. 5 shows a sectional view of the laminated card body.
Figure 6:
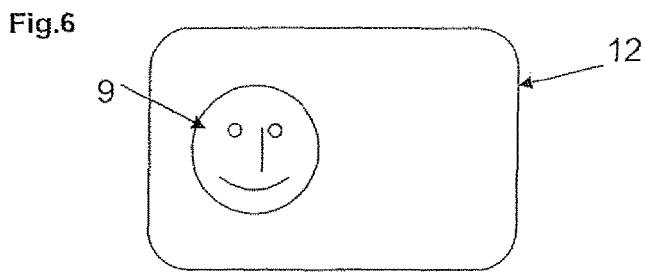
FIG. 6 shows a plan view of the punched out individual identity card with the individualized hologram in the interior.

The two-layered composite foil (6) manufactured in this manner with an approximately 50 µm thick individualized hologram label (9) covered by adhesive (FIG. 3) and located between the thermoplastic foils (5.1 and 5.2) is now laminated, together with other thermoplastic foils (5), to form the card body (10), in the card-lamination press (FIG. 4) at a temperature of 180° C. and the usual high pressure (FIG. 5). The card body is punched out to form individual identity cards (12) in the ID-1 format. Identity cards are obtained having the required mechanical and chemical durability, with smooth polycarbonate surfaces and a brilliant, individualized hologram (9) in the interior. The edges of adhesive and surfaces within the identity card surface are no longer visible (FIG. 6) although they clearly were before card body lamination in the two-layered composite foil (6) (FIG. 3).

EXAMPLE 2

A reflection volume hologram film, which has been baked for 5 minutes at 150° C., is processed as described in Example 1 and integrated in the two-layered composite foil (6). The individualized hologram (9) has a diffraction efficiency which is approximately 20% lower than that of the individualized hologram in the two-layered composite foil of Example 1. The two-layered composite foil is laminated with other polycarbonate foils (5), in a well-known manner, to form the card body (10). A card body (10) with an embedded, individualized hologram (9) is obtained, which has a higher brilliancy than before the card-lamination process.

LIST OF REFERENCE SIGNS 1. reflection volume hologram label film
2. volume hologram label
3. carrier foil
4. adhesive
5. thermoplastic foil
6. two-layered composite foil
7. radiation-curing monomer-containing adhesive
8. mask
9. individualized hologram label
10. card body
11. metal plate
12. identity card

The invention claimed is:
1. A method for producing a document with an embedded hologram comprising:
   arranging a plurality of reflection volume hologram labels on a carrier foil, each of the reflection volume hologram labels having oppositely disposed first and second surfaces and oppositely disposed third and fourth surfaces, the first and second surfaces being substantially perpendicular to the third and fourth surfaces;
   arranging a plurality of spatially separated first adhesive areas on a first thermoplastic foil having a surface with a surface roughness;
   contacting each of the reflection volume hologram labels with a respective one of the first adhesive areas, such that, the second, third, and fourth surfaces of each of the reflection volume hologram labels are entirely contacted with the respective one of the first adhesive areas;
   curing each of the first adhesive areas and subsequently removing the carrier foil from the plurality of first adhesive areas;
   applying a plurality of second adhesive areas having the same spatial separation as the plurality of first adhesive areas, such that, one of the second adhesive areas is applied to each of the first adhesive areas and to substantially an entire first surface of each of the plurality of reflection volume hologram labels, and such that, each of the reflection volume hologram labels is embedded entirely between first and second adhesive areas, and each of the first adhesive areas is embedded entirely between the first thermoplastic foil and one of the second adhesive areas;
   adhesively bonding a second thermoplastic foil having a surface with a surface roughness to the applied second adhesive areas to form a two-layered composite foil having the reflection volume hologram labels embedded therein, whereby the surface with the surface roughness of the first thermoplastic foil and the surface with the surface roughness of the second thermoplastic foil are filled with adhesive, the adhesive applied to the second adhesive areas being a radiation-curing monomer-containing adhesive, the second adhesive areas being first partially cured through a partially transparent personal data bearing mask by ultraviolet light, and subsequently completely cured by light after a retention time during which monomers diffuse from remaining non-cured adhesive areas of the applied second adhesive areas into the hologram, resulting in individualization of the hologram; and laminating the two-layered composite foil, together with a plurality of thermoplastic foils, in a card-lamination press with pressure support and temperature support to form a card body having the two-layered composite foil embedded therein, and punching out the card body to form individual identity cards, the laminating rendering edges of the adhesive areas and surfaces of the reflection volume hologram label, within the card body, non-visible.

2. The method of claim 1, wherein each of the applied second adhesive areas entirely covers a corresponding one of the cured first adhesive areas.

3. The method of claim 1, wherein the two-layered composite foil has a layer thicknesses of less than 80 μm.

4. The method of claim 1, wherein the thermoplastic foils are made from polycarbonate, and wherein the cured adhesives have a refraction index of at least 1.49.

5. The method of claim 1, wherein each of the reflection volume hologram labels was not bake prior to forming the two-layered composite foil, and wherein each of the reflection volume hologram labels reaches a higher diffraction efficiency or higher brilliancy subsequent to embedding the two-layered composite foil together with the plurality of thermoplastic foils into the card body.

6. The method of claim 1, wherein the lamination in the card-lamination press includes providing a maximum temperature of 180° Celsius and pressure in a range from 3 to 5 bar.

7. The method of claim 1, wherein the adhesive layers smooth the surfaces of the two-layered composite foil by filling in areas of the surface with the surface roughness of the first thermoplastic foil and areas of the surface with the surface roughness of the second thermoplastic foil.

* * * * *